United States Patent [19]

Mar

[11] Patent Number: 4,768,795
[45] Date of Patent: Sep. 6, 1988

[54] MULTI-PURPOSE STROLLER WITH DETACHABLE FRAME

[76] Inventor: Shih-Lin Mar, 3rd Fl., No. 10, Lane 134, Tzyh Li Street, Hsin Tien City, Taipei Hsien, Taiwan

[21] Appl. No.: 67,379

[22] Filed: Jun. 26, 1987

[51] Int. Cl.⁴ .............................................. B62B 7/12
[52] U.S. Cl. ...................................... 280/30; 280/643; 280/648; 280/650; 280/805; 297/255; 297/471
[58] Field of Search .................. 280/30, 42, 643, 644, 280/648, 650, 805; 297/250, 254, 255, 377, 471

[56] References Cited

U.S. PATENT DOCUMENTS

| | | | |
|---|---|---|---|
| 3,116,069 | 12/1963 | Dostal | 280/30 |
| 3,550,998 | 12/1970 | Boudreau et al. | 280/648 |
| 3,829,113 | 8/1974 | Epelbaum | 280/30 |
| 4,500,133 | 2/1985 | Nakao et al. | 297/377 |
| 4,632,409 | 12/1986 | Hall et al. | 280/643 |
| 4,641,844 | 2/1987 | Mar et al. | 280/30 |

FOREIGN PATENT DOCUMENTS

| | | | |
|---|---|---|---|
| 515393 | 3/1921 | France | 280/42 |
| 2394435 | 12/1979 | France | 280/644 |
| 1439942 | 6/1976 | United Kingdom | 280/42 |

Primary Examiner—David M. Mitchell
Assistant Examiner—Brian L. Johnson
Attorney, Agent, or Firm—Poms, Smith, Lande & Rose

[57] ABSTRACT

A baby stroller comprising a seat portion and a frame portion separable from the seat portion. The stroller seat comprises a concave front portion forming a seat and a pair of opposite retaining walls. A flexible safety belt serving both as fastening means and buffer means is provided on the stroller seat. A pivotally adjustable U-shaped stand, which enables the stroller seat to be positioned as a seat or a bed without the stroller frame attached to, is provided on the back of the stroller seat. The stroller frame is collapsable and can be folded into a compact volume when not in use. The assembly and disassembly of the stroller seat and the stroller frame can be easily achieved by turning a couple of engagement members.

3 Claims, 10 Drawing Sheets

MULTI-PURPOSE STROLLER WITH DETACHABLE FRAME

BACKGROUND OF THE INVENTION

This invention relates to a baby stroller with a detachable frame, particularly to a baby stroller in which the collapsible stroller frame is detachable from the seat portion of the stroller.

A multi-purpose baby stroller has been disclosed in U.S. Pat. No. 4,641,844 to Mar et al. The multi-purpose stroller for an infant is collapsible, and has a retractable pushing bar and a collapsible rear rod to permit conversion into a baby holder, a back-mounted infant carrier, an infant seat or safety car seat. Although the stroller of Mar et al. is suitable on many occasions as described above and is compact when not in use due to its collapsibility, it still has the following disadvantages:

(a) Since the seat portion of the stroller and the stroller frame thereof are fixedly mounted together, the stroller frame becomes a wearisome extra weight as the stroller is used as a baby holder or a back-mounted baby carrier;

(b) As the stroller is mounted on the seat of a car as a safety seat for a baby, the casters possibly having mud or dirt thereon will dirty the seat of a car. Further, the stroller frame will occasionally hinder the movement of the car's driver; and (c) Although the safety belt of the baby stroller is adjustable in length, due to the inflexibility of the belt or lack of a cushion mechanism on the belt, it can not provide a cushion effect to protect the baby in the event of a collision of the stroller.

SUMMARY OF THE INVENTION

A primary objective of the invention is therefore to provide a baby stroller which mitigates and/or obviates the above-described drawbacks of the prior art.

Another objective of the invention is to provide a baby stroller in which the seat portion and the stroller frame are easily detachable from each other.

Still another objective of the invention is to provide a baby stroller in which the stroller seat with the stroller frame detached therefrom can be independently used as a baby seat, baby bed, baby holder and back-mounted baby carrier.

A further objective of the invention is to provide a baby stroller in which the safety belt is connected to a cushion apparatus, thereby providing better protection to the baby in the stroller if the stroller suddenly is stopped.

Still another objective of the invention is to provide a baby stroller in which the stroller frame is collapsible.

Further objectives and advantages of the present invention will become apparent as the following description proceeds with reference to the accompanying drawings.

DETAILED DESCRIPTION OF THE PREFERRED EMBODIMENT

Figure 1:
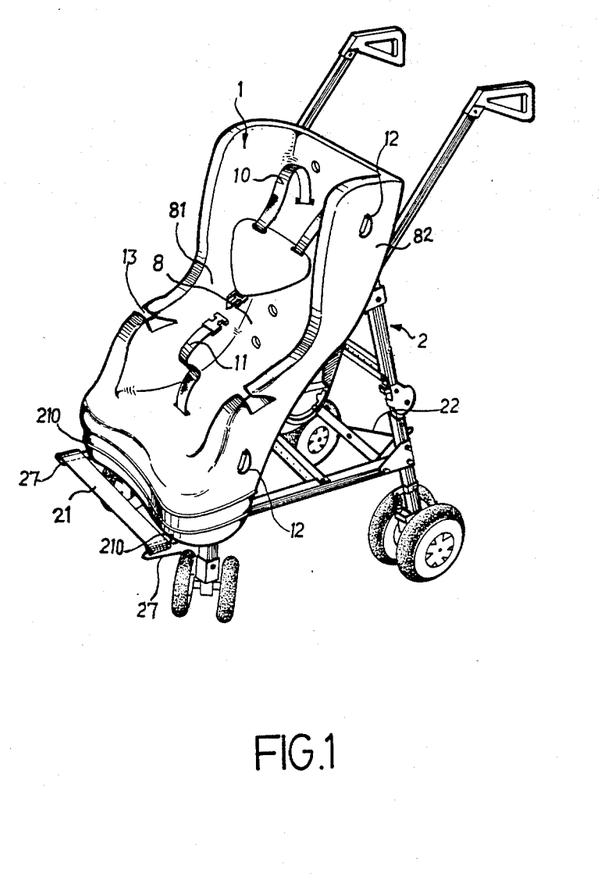
FIG. 1 is a perspective view of a preferred embodiment of a baby stroller according to the present invention.

Referring to the drawings, particularly to FIG. 1, it can be seen that the multi-purpose stroller, a preferred embodiment of the present invention, comprises a stroller seat or seat portion 1 and a stroller frame 2 which is separable from the stroller seat 1. The front portion of the stroller seat 1 is concave so as to form a seat 8 with a pair of parallel retaining walls 81 and 82 on both sides thereof. Upper and lower parts, 10 and 11, of the safety belt, are disposed on the upper and lower front of the seat 8, respectively, with the rear ends of the upper and lower parts 10 and 11 of the safety belt passing through corresponding holes on the seat 8 to the rear side thereof. On an appropriate middle position of the front edge of each retaining wall 81 or 82, a recess 13 is formed so as to receive a fastening safety belt in a car for fastening the stroller (to be described later). On the upper and lower surfaces of each retaining wall 81 or 82, an engagement ring 12 is respectively provided. The free ends of the upper and lower parts 10 and 11 of the safety belt are engageable to each other and serve as easily detachable fastening means for the baby seated in the stroller seat 1.

Figures 2, 3:
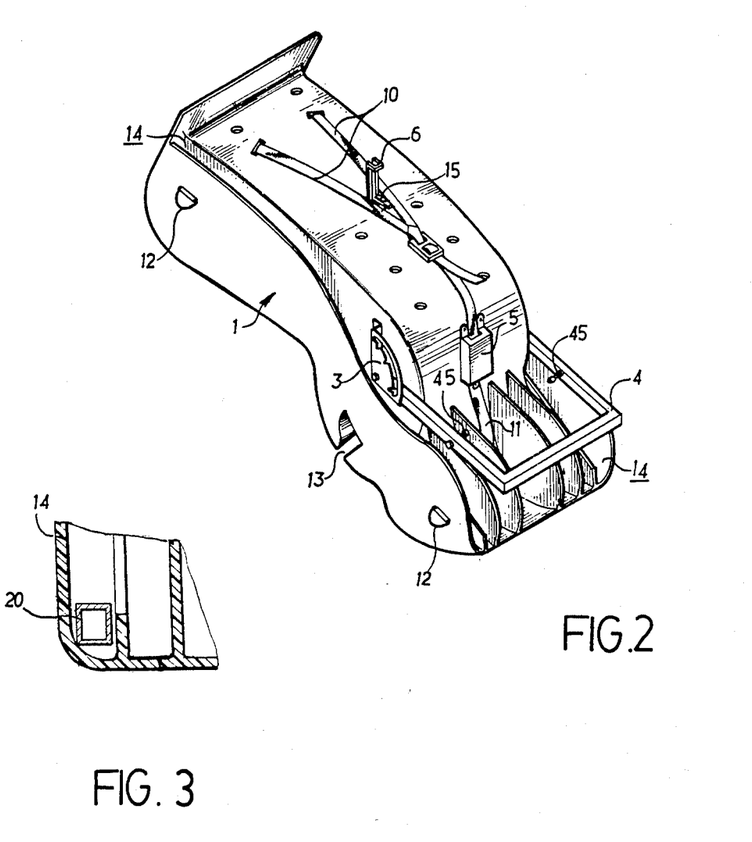
FIG. 2 is a perspective view of the stroller seat without the stroller frame attached thereto.
FIG. 3 is a cutaway cross-sectional view of a portion of the stroller seat as shown in FIG. 2.
Figure 4:
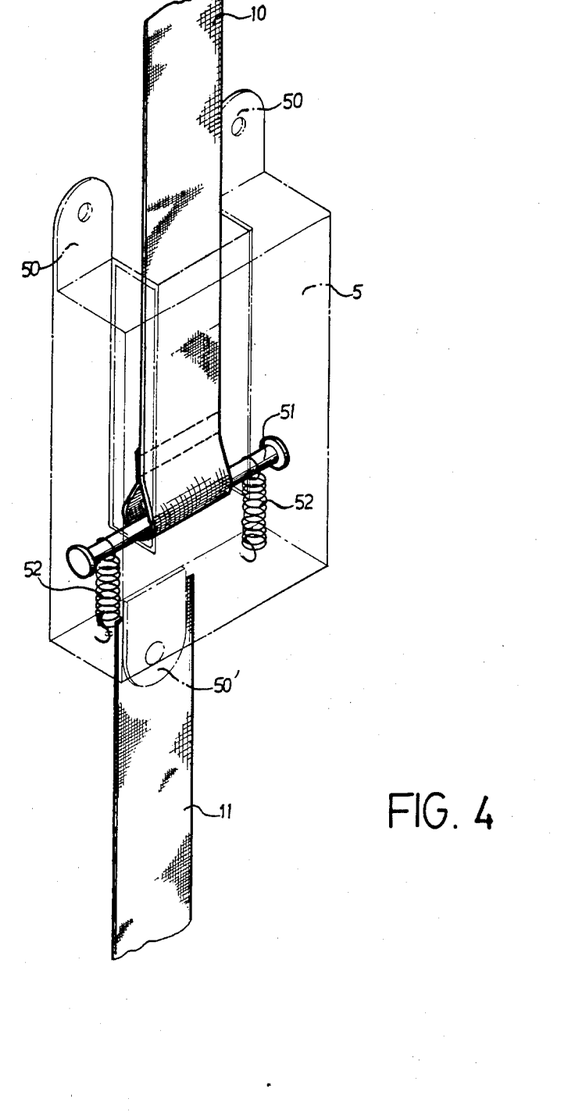
FIG. 4 is a perspective view of the cushion apparatus of the safety belt of the stroller seat.

Referring to FIG. 2 and 4, it can be seen that the rear ends of the upper and lower parts 10 and 11 of the safety belt are respectively secured to a securement block 5 set on the rear middle surface of the stroller seat 1. The rear end of the lower part 11 of the safety belt is fixedly secured to the securement block 5 at the position of the lug 50'. The securement block 5 has an inner hollow space and is secured to the rear middle surface of the stroller seat 1 with lugs 50 and 50' being fixed thereto. The rear end of the upper part 10 of the safety belt is attached to a rod 51. Each side of the rod 51 is retained by one end of a spring 52 which attaches, with the other end of the springs being attached to the securement block 5. The resilience of the springs 52 enables the upper part 10 of the safety belt to serve as a buffer means for preventing the baby from being hurt by the safety belt itself should the stroller be suddenly stopped.

Figure 5:
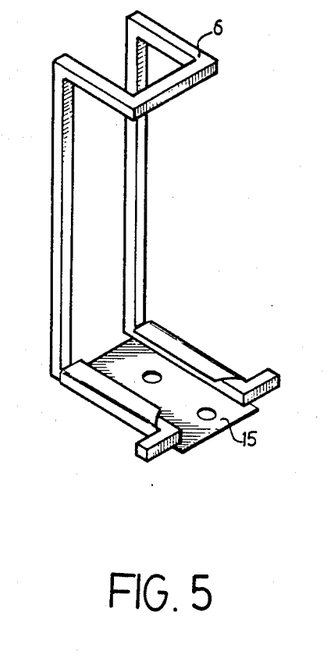
FIG. 5 is a perspective view of the hooked brace and the retaining plate thereof.
Figure 6:
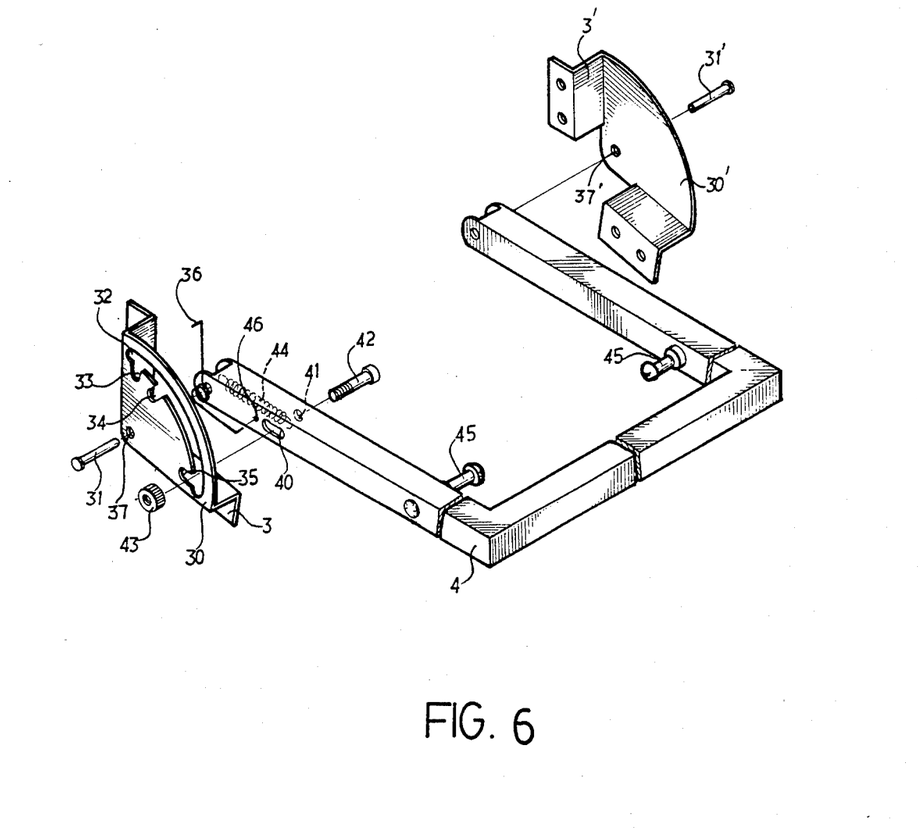
FIG. 6 is an exploded view of the U-shaped seat stand and the supporting plates thereof.

Referring further to FIG. 3, 5 and 6, it can be seen that a hooked brace 6 is retained by a double-hooked retaining plate 15 which is secured to an appropriate position of the rear surface of the stroller seat 1. The hooked brace 6 is used to engage with the stroller frame 2 (to be described later) while assembling the stroller seat 1 to the stroller frame 2. Each lateral side of the rear face of the stroller seat 1 is provided with a lengthy inward space or channel 14 substantially extending from the upper end of the stroller seat 1 to the lower end thereof. Both channels 14 are parallel to each other and used for receiving two front frame sections 20 (i.e. right and left) of the stroller frame 2 (see FIGS. 3 and 7) during the assembly of the stroller seat 1 and frame 2. Each lateral side of the rear surface of the stroller seat 1 is set with a quarter-circular supporting plate 3 or 3' for pivotally securing one end of the U-shaped stroller-seat stand 4. An arched slot 32 with three positioning recesses 33,34 and 35 thereon is provided near the circular edge of the quarter-circular supporting plate 3. Each end of the U-shaped stand 4 is pivoted to the supporting plate 3 and 3' with a pin 31 or 31' passing through a corresponding respective hole 37 or 37', respectively. A restoring torsional spring 36 is provided around the pin 31 with one end thereof attached to a hole 46 provided on the U-shaped stand 4 and with the other end thereof hooked to an edge of the slotted support plate 3. A positioning bolt 42 going through a circular bolt hole 41 and an elliptical hole 40 respectively provided on the U-shaped stand 4 is threaded on with an easy-to-grip nut 43. The torsional spring 36 provides a resilient force as it deforms, to urge the U-shaped stand 4 to pivot back to the original lower position thereof where the positioning bolt 42 with the nut 43 thereon is adjacent to the recess 35 in the arched slot 32. An extension spring 44 with either end thereof respectively connecting to the pin 31 and the positioning bolt 42 urges the positioning bolt 42 to go into any one of the three recesses 33, 34 and 35. Therefore, the U-shaped stand 4 will be stabilized in the position relative to the stroller seat, as shown in FIG. 2, with the positioning bolt 42 engaging with the recess 35 as no external force is applied against the torsional spring 36. Hence, if it is intended for the baby to be seated in the stroller seat (with or without the stroller frame 2 attached thereto), this can be done by moving the positioning bolt 42 to disengage with the recess 35 and then after pivoting the U-shaped stand 4 upwards to the recess 34, releasing the positioning bolt 42 to become engagement with the recess 34. The stroller seat 1 thereby stands in a posture suitable for a baby to sit on. In a manner, if it is intended for the baby to sleep on the stroller seat 1 without the stroller frame 2 attached thereto, the positioning bolt 42 is lifted against the extension spring 44 to disengage with the recess 34 or 35 and then the bolt 42 is urged to engage with the recess 33. It is thus suitable for a baby to lie horizontally on the stroller seat 1. It is noted that according to the description presented hereinbefore the stroller seat 1, without the stroller frame 2 attached thereto, is suitable for a baby to either lie or sit on, and also suitable for being held or back mounted with the U-shaped stand 4 in a non-stretched position. A post 45 is set on each inner side of the parallel sections of the U-shaped stand 4 and thus two posts 45 face towards each other.

Figure 7:
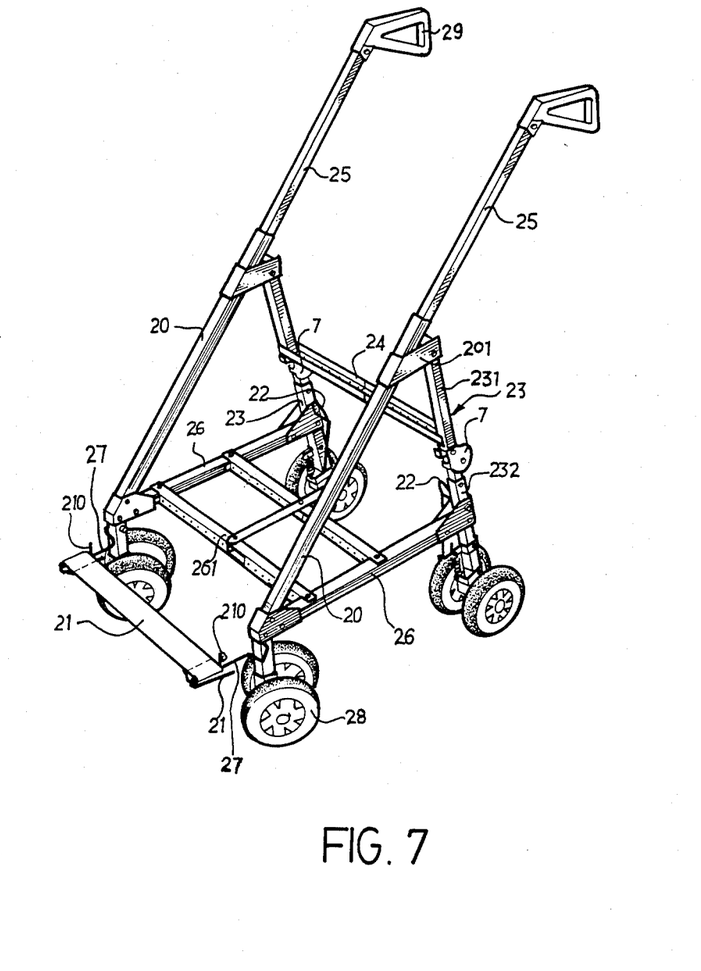
FIG. 7 is a perspective view of the stroller frame.
Figure 8:
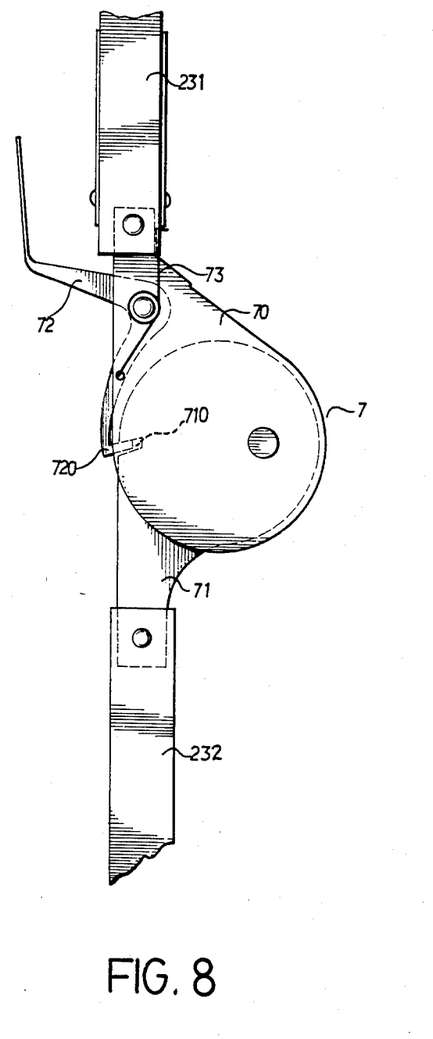
FIG. 8 is a cutaway side view of a pivotal connection means connecting to upper and lower members of the rear frame section.
Figure 9:
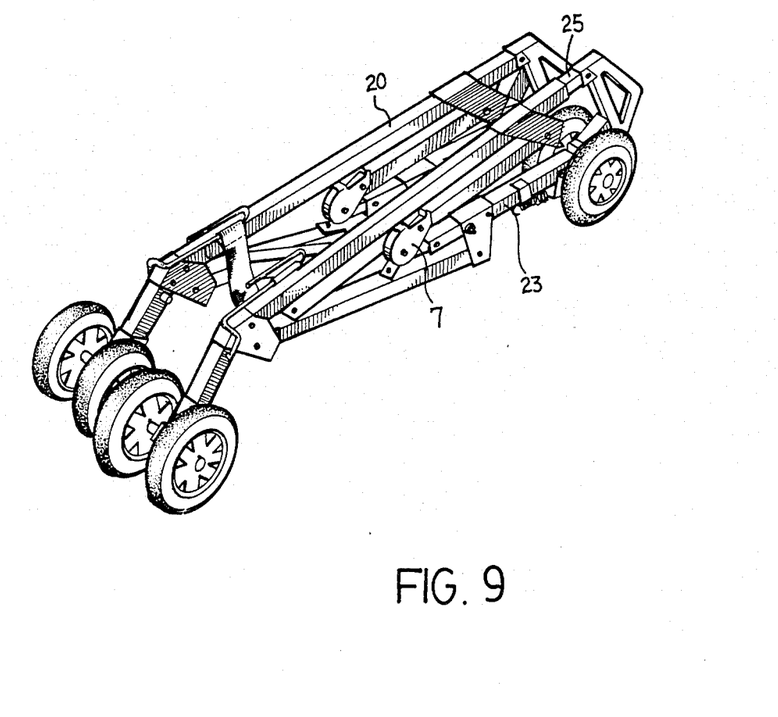
FIG. 9 is a perspective view of the stroller frame, as shown in FIG. 7, in a collapsed condition.

Referring now to FIGS. 7 thru 9, the structure of the collapsible stroller frame 2 will be clearly described hereinafter. The stroller frame 2 comprises two front frame sections 20, each of whose lower ends connects to a caster 28 and each of whose upper ends connects to a hand frame section 25. Each of the hand frame sections 25 is extendable from the upper end of the front frame section 20 because the hand frame section 25 is slidably received in the front frame section 20. Each of the hand frame sections 25 has a hand hoop 29 attached thereon for convenience of grippage. A bracket 201 is attached to the upper end of each front frame section 20 and the upper end of a rear frame section 23 is pivoted to the bracket 201. Each of the rear frame sections 23 comprise an upper member 231 and a lower member 232 which are connected to each other by a pivot joint 7. Referring to FIG. 8, it can be seen that each of the pivot joints 7 comprises an upper and lower disks 70 and 71 pivoted together, an engagement detent 72 with a hook 720 pivoted to the upper disk 70, a torsional spring 73 respectively attached to the upper member 231 and the engagement detent 72 for providing a stabilizing force on the detent 72. The lower disk 71 is provided with a recess 710 and the upper and lower member 231 and 232 of the rear frame section 23 will keep straight as the hook 720 of the engagement detent 72 is pivoted to engage with the recess 710 of the lower disk 71. This means that the pivot joint 7 provides the upper and lower members 231 and 232 of the rear frame section 23 with means for stable pivotal connection. The lower end of the lower member 232 of each rear frame section 23 is attached with a caster 28. A rear foldable brace 24 is connected, with both ends thereof, to the upper members 231 of the rear frame section 23. A lower frame section 26 is respectively connected, with both ends thereof, to the lower end of each front frame section 20 and the lower member 232 of the rear frame section 23. Across the pair of lower frame sections 26 there is provided an H-shaped foldable brace 261. A foot rest 10 is provided in front of the lower ends of the front frame sections 20 on a pair of supporting wires 27 each with a vertical stop 210. Each lower member 232 of the rear frame section 23 has a stroller-seat detent 22 attached thereto. Referring to FIG. 9 and according to the description hereinbefore, it can be seen that the stroller frame 2 is collapsable and can be folded into a compact volume for the convenience of storage, carriage, etc. when not in use.

Referring now to FIGS. 1 thru 3 and 7, the assembly and disassembly of the stroller seat 1 and the stroller frame 2 will be further described. If the assembly of the stroller seat 1 and the stroller frame 2 is desired, it can be done by: first, extending the stroller frame 2 and letting it stand as shown in FIG. 7; then adjusting the stroller seat 1 into a posture suitable to sit on; further, pushing the stroller frame 2 so as to make the two front frame sections 20 engage with the two corresponding channels 14 of the stroller seat 1 and so as to let the front lower end of the stroller seat contact with the stops 210 on the stroller frame 2; subsequently, engaging the hooked brace 6 on the back of stroller seat 1 with the rear foldable brace 24 of the stroller frame 2; and finally, letting two stroller-seat detents 22 of the stroller frame 2 hook the pair of opposite posts 45 on the U-shaped stand 4 of stroller seat 1. The assembly of the stroller seat 1 and frame 2 is thus completed. When the disassembly of the stroller seat 1 and frame 2 is desired, it can be easily achieved by disengaging the stroller-seat detents 22 with the opposite posts 45, and disengaging the hooked brace 6 with the rear foldable brace 24.

Figure 10:
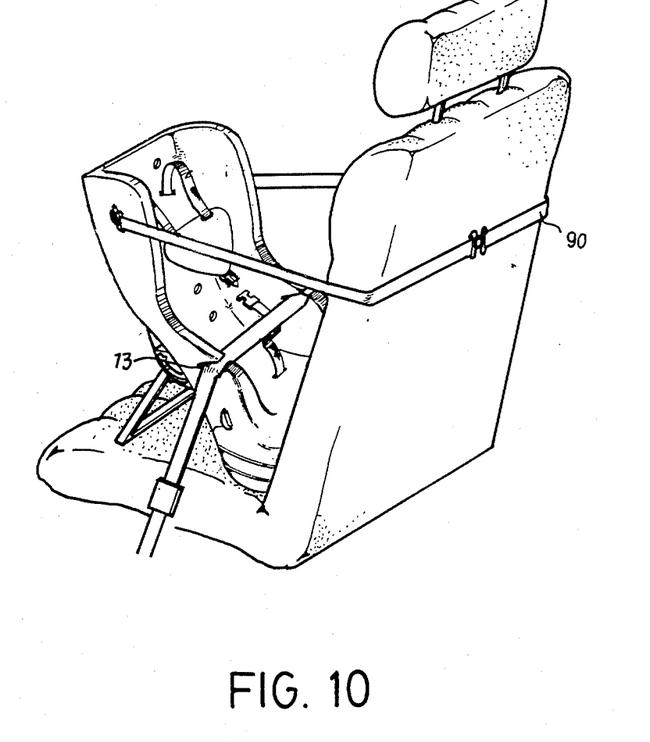
FIG. 10 shows a working view of the baby stroller, without the stroller frame attached thereto, as a safety car seat.
Figure 11:
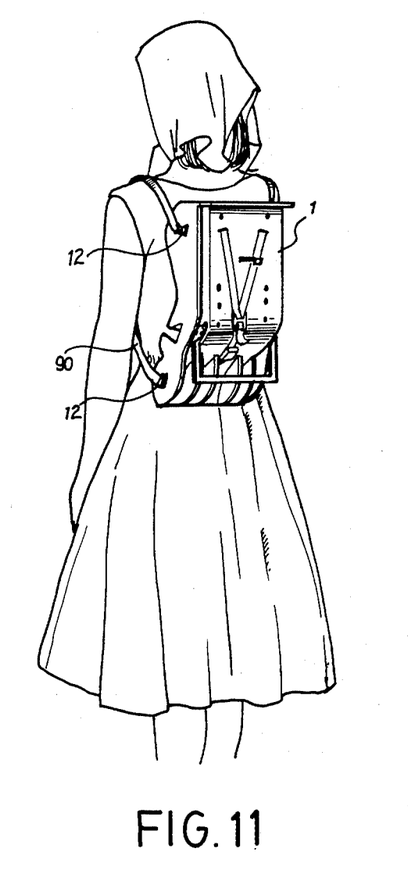
FIG. 11 shows another working view of the baby stroller, still without the stroller frame attached thereto, as a back-mounted baby carrier.

Referring to FIGS. 10 and 11, two working situations of the stroller seat 1 without the stroller frame 2 attached thereto can be clearly seen. FIG. 10 shows the stroller seat 1 installed on a car seat to carry a baby. The safety belt of the car seat is wrapped around the stroller seat 1 and through the two recesses 13 so as to secure the stroller seat 1. An additional fastening strip 90 is urged to engage with the upper engagement rings 12 so as to provide additional fastening means. It is noted that the car seat will not get dirty as in the prior art (Mar et al) since the stroller frame 2 is detached. FIG. 11 shows that the stroller seat 1 without the stroller frame 2 attached to is back-mounted for carrying a baby therein. A pair of fastening strips 90 respectively engage with the engagement rings 12 set on outer surface of the stroller seat 1. It is noteworthy that the weight of the stroller is significantly reduced due to the detachment of the stroller frame 2 from the stroller seat 1.

As various possible embodiments might be made of the above invention without departing from the scope of the invention, it is to be understood that all matter herein described or shown in the accompanying drawings is to be interpreted as illustrative and not in a limiting sense. Thus it will be appreciated that the drawings are exemplary of a preferred embodiment of the invention.

I claim:

1. A multi-purpose stroller with a detachable frame comprising:
   (a) a stroller seat having a concave front portion forming a seat and a pair of retaining walls; a recess for receiving a car safety belt being provided on a front edge of each said retaining wall; a lengthwise channel being provided on each lateral side of a rear surface of said stroller seat; a hooked brace being perpendicularly mounted on a rear middle position of said stroller seat;
   (b) a safety fastening belt assembly including an upper and lower part; front portions of said upper and lower parts of said belt being disposed in front of said stroller seat; a rear portion of said upper part of said belt passing through holes on said stroller seat and then attached to a buffer means disposed to the rear surface of said stroller seat; a rear portion of said lower part of said belt passing through a hole on said stroller seat and being fixedly secured to said buffer means;
   (c) a pivotally adjustable U-shaped stand; each end of said U-shaped stand being pivoted to a supporting plate; each of said supporting plates being mounted on each lateral side of said rear surface of said stroller seat; one of said supporting plates having an arched slot with three positioning recesses therein; a positioning bolt attached to said U-shaped stand going through said U-shaped stand and said arched slot; an extension spring connecting to said positioning bolt; a torsional spring being attached to said U-shaped stand for providing restoring torsional force; a pair of posts facing towards each other each being provided on an inner surface of said U-shaped stand; and
   (d) a collapsible stroller frame; said stroller frame including a pair of front frame sections for said lengthwise channel to be mounted on; each of said front frame sections having an extendable hand frame section; a pair of rear frame sections each pivoted to one of said front frame sections; two lower frame sections each connecting to one of said rear frame sections and one of said front frame sections; a foldable brace connecting to both of said rear frame sections and engaging said hooked brace of said stroller seat; two casters being attached to lower ends of said front frame sections and two casters attaching to lower ends of said rear frame sections; a pair of detents each being attached to one of said rear frame sections for hooking said pair of posts.

2. A multi-purpose stroller as claimed in claim 1, wherein said buffer means comprises a securement block attached to a rear surface of said stroller seat; a rod retaining said rear portion of the upper part of said fastening belt, and two extension springs; one end of each of said extension springs attaching to said rod and the other end of each of said extension springs attaching to said securement block.

3. A multi-purpose stroller as claimed in claim 1, wherein each of said rear frame sections comprises an upper and a lower member and a pivot joint connecting to said upper and lower members; each of said pivot joints comprising an upper and a lower disk pivoted together; an engagement detent with a hook being pivoted on said upper disk; a torsional spring attaching to said engagement detent; a recess being provided on said lower disk for said hook of said engagement detent to engage therewith.

* * * * *